United States Patent
Hong et al.

(10) Patent No.: US 6,466,401 B1
(45) Date of Patent: Oct. 15, 2002

(54) THIN FILM WRITE HEAD WITH INTERLACED COIL WINDING AND METHOD OF FABRICATION

(75) Inventors: Liubo Hong, San Jose; Ronald A. Barr, Mountain View, both of CA (US)

(73) Assignee: Read-Rite Corporation, Fremont, CA (US)

( * ) Notice: Subject to any disclaimer, the term of this patent is extended or adjusted under 35 U.S.C. 154(b) by 0 days.

(21) Appl. No.: 09/325,057

(22) Filed: Jun. 2, 1999

(51) Int. Cl.[7] .............................................. G11B 5/147
(52) U.S. Cl. ...................................... 360/123; 360/317
(58) Field of Search ................................ 360/123, 317, 360/318.1, 124, 320; 29/603.23, 603.24, 603.25, 603.26; 378/34; 101/130

(56) References Cited

U.S. PATENT DOCUMENTS

| | | | | |
|---|---|---|---|---|
| 5,124,870 A | * | 6/1992 | Toyoda | 360/126 |
| 5,691,867 A | * | 11/1997 | Onuma et al. | 360/126 |
| 5,703,740 A | * | 12/1997 | Cohen et al. | 360/126 |
| 5,856,898 A | * | 1/1999 | Ohashi | 360/123 |
| 6,014,422 A | * | 1/2000 | Boyd et al. | 378/34 |
| 6,038,106 A | * | 3/2000 | Aboaf | 360/317 |
| 6,043,959 A | * | 3/2000 | Crue et al. | 360/317 |
| 6,088,197 A | * | 7/2000 | Tsuda | 360/317 |
| 6,191,916 B1 | * | 2/2001 | Sasaki | 360/126 |

FOREIGN PATENT DOCUMENTS

JP 11-259813 * 9/1999

* cited by examiner

Primary Examiner—Brian E. Miller
Assistant Examiner—Tianjie Chen
(74) Attorney, Agent, or Firm—Carr & Ferrell LLP

(57) ABSTRACT

The preferred embodiment of the present invention provides a write head having an interlaced conductor coil winding and method of fabrication. The interlaced winding of the present invention may have alternating turns of a first and a second coil. In the preferred embodiment, the side walls of successive coil turns are separated by an ultra thin inorganic insulation which defines the distance between successive turns of the first and second coil. In one method of fabrication, a conductive seed layer is deposited on a generally planar insulative surface, a resist mask is formed on the seed layer, and a conductive material deposited on the exposed seed layer to form the turns of the first coil. The masked portions of the seed layer are removed, after resist mask removal, to electrically isolate the turns of the first coil. The inorganic insulation may be formed in a layer conformal with the first coil. The second coil is formed between the turns of the first coil. A seed layer and mask may be used to facilitate second coil deposition. Etching, or planarization, may be used to electrically isolate the turns of the second coil. A capping layer may be formed over any exposed conductor material to insulate the winding from an upper pole structure or other overlying structure. Embodiments of the present invention may have multiple layers of conductor winding having some conventional, or all interlaced coil structure.

24 Claims, 11 Drawing Sheets

THIN FILM WRITE HEAD WITH INTERLACED COIL WINDING AND METHOD OF FABRICATION

BACKGROUND OF THE INVENTION

1. Technical Field

The present invention relates to the field of thin film write heads.

2. Background Art

Data is stored on magnetic media by writing on the magnetic media using a write head. Magnetic media can be formed in any number of ways, such as tape, floppy diskette, and hard disk. Writing involves storing a data bit by utilizing magnetic flux to set the magnetic moment of a particular area on the magnetic media. The state of the magnetic moment is later read, using a read head, to retrieve the stored information.

Data density is determined by the amount of data stored on an area of magnetic media and depends on how much area must be allocated to each bit. Data on magnetic media is often stored in a line or track. Magnetic media often have multiple tracks. In the case of the disk, the tracks are nested annular rings. More bits per ring and more rings per disk increases data density. Data density, therefore, is determined not only by the bit length, but also by the width of the bit which determines the track width. To decrease bit size, head size is decreased by fabricating thin film read and write heads with smaller track widths. Thin film heads commonly employ separate write and read heads.

Typically write heads do not contact the magnetic media but instead are separated from the magnetic media by a layer of air or air bearing. Magnetic flux generated between poles of the write head acts across the air bearing to change the magnetic moment of an area on the magnetic media.

Thin film write heads are typically formed by depositing and etching layers of magnetic, non-magnetic, dielectric, and electrically conductive materials to form the structures of the head, such as a core, a conductor winding, and upper and lower pole structures.

The rate or frequency that data is stored to the media is an important measure of the operational performance of the write head. One way to improve the operating frequency of the write head is to reduce the length of the pole structures, such as the yoke, to decrease the head inductance and the magnetic flux rise time. The operating frequency is determined, in part, by the structure of the write head and the materials used. The efficiency of the write head is also increased by reducing the yoke length.

Typical conductor windings of write heads are formed by first depositing a seed layer on a cured photoresist layer. To form the conductor winding, a photoresist pattern is formed on the seed layer by depositing photoresist on the seed layer, exposing to light through a photo mask, and removing a portion to form a trench extending to the seed layer. The trench defines the placement and dimensions of the conductor that forms the winding. The conductor winding typically is deposited by electroplating with copper to form the conductor winding within the trench on the exposed seed layer.

After forming the conductor winding, the photoresist pattern is stripped, and a wet chemistry etch is used to remove the remaining copper seed layer. As the seed layer typically is removed by wet chemistry etch, part of the winding conductor material is also etched away. The winding is surrounded with photoresist, which is cured to form an organic dielectric insulation.

Additional conductor windings typically are formed over the above described winding in a similar fashion, and electrically connected to it to form a multi-layered conductor winding.

One problem with the above process is that it limits the minimum dimension of the winding. The distance between corresponding edges of successive conductor turns, referred to as the pitch, and the height of the conductor are limited by photolithographic techniques. As such the height to width ratio or aspect ratio of the conductor is usually less than about 1.5. In addition, the minimum width of the photoresist defining the trench typically is greater than about 0.4 microns.

Another drawback of the above process and structure is that it produces a coil structure with a high overall stack height. Because the pitch is limited and the total length of the coil winding is relatively long, the conductors are often formed having greater height to provide sufficient cross sectional area in order to achieve sufficiently low coil resistance. In addition, a second or even a third winding layer often is formed to increase the number of coil turns without drastically increasing the yoke length to improve the operation of the winding. Also, because cured photoresist is difficult to form in extremely thin layers, the cured photoresist insulation typically formed under the conductor winding significantly increases the overall stack height.

High stack height makes it difficult to control the width of the upper or P2 pole tip in certain write head designs, thus leading to increased track width sigma. The increased stack height can cause problems with focusing and scattering during the exposure process, as well as problems of shadowing during pole trim process.

In addition, high stack height can cause reliability problems, such as cracking of the magnetic yoke material at the apex, or on the sloped surface between the top of the stack and the pole tip. Also, the steep slope associated with the high stack height causes the magnetic properties of the yoke material to degrade.

Furthermore, thermal stability is a problem with the structure described above. There is a large thermal expansion mismatch between the metal and the surrounding cured photoresist. The coefficient of expansion of the cured photoresist $\alpha_{resist}$ is greater than about several times the coefficient of expansion of the conductor $\alpha_{metal}$. This can cause separation of yoke from the underlying insulation when the head is heated to higher temperature during manufacture, or operation.

BRIEF SUMMARY OF THE INVENTION

The preferred embodiment of the present invention provides a write head having an interlaced conductor coil winding and method of fabrication.

The interlaced winding may have alternating turns of a first and a second coil. In the preferred embodiment, the side walls of successive coil turns are separated by an ultra thin insulation, preferably formed by a layer of inorganic insulation. In the preferred embodiment, the side wall insulation defines the distance between the successive turns of the interlaced coil.

In a preferred method, the interlaced winding is fabricated by forming the first coil having turns which are separated by a space. The second coil is formed so that its turns are disposed between the turns of the first coil.

In one method of fabrication, a conductive seed layer is deposited on a generally planar insulative surface, such as a write gap, a middle coat, or other insulation layer on or above the lower yoke.

A resist mask structure may be formed on the seed layer to define the layout of the coil. With this method, conductive material is deposited on exposed seed layer in a channel defined by the resist mask, thus forming the turns of the first coil. The underlying masked portion of the seed layer may be removed after resist mask removal to electrically isolate the turns of the first coil.

With the preferred method, the second coil is formed after deposition of an insulation material on the side walls of the first coil structure. It is preferred to form a layer of inorganic insulation conformal with the first coil. As such, the inorganic insulation lines the space between the turns of the first coil. The turns of the second coil may then be formed between the turns of the first coil, with the sidewall insulation material defining the distance between successive turns of the first and second coil.

One method to fabricate the turns of the second coil is to deposit a second seed layer on the conformal insulation layer and use a resist mask to define the turns of the second coil between the turns of the first coil. The resist mask may be removed, after formation of the second coil, and the portion of the seed layer underlying the resist mask removed to electrically isolate the turns of the second coil.

The turns of the second coil may be isolated by dry or wet etching techniques, or, by lapping away the portion of the seed layer overlying the turns of the first coil, such as by a chemical mechanical polish. As such, in some embodiments, the second coil is unplanarized, while in other embodiments the second coil is planarized. In some embodiments, it is acceptable to lap into a portion of the conformal insulation layer overlying the turns of the first coil. With other embodiments, it even is possible to lap into the top portion of the turns of the first coil during this procedure. An optional capping layer, or other insulation layer, may be formed over any exposed conductor material to insulate the winding from an upper pole structure or other overlying structure. As such, in the cross-sectional view of some of the embodiments, the turns of the first coil appear to project upward from the lower insulation layer, while the turns of the second coil appear to depend downward between the turns of the first coil from an overlying capping layer, with insulation material disposed between successive coil turns, similar in appearance to the carved teeth of a Halloween "Jack-O-Lantern" pumpkin.

In another method of the present invention, the second turns may be formed without using a resist mask over the first coil. With such a method, planarization may be used to remove the conductive material overlying the first coil to electrically isolate the turns of the second coil. As discussed above, the planarization may lap into the insulation layer or the turns of the first coil to define the turns of the second coil.

Some embodiments of the write head of the present invention may have multiple layers of conductor winding. The additional layers may be formed using conventional methods and structure, or may have the interlaced coil structure of the present invention.

An advantage of the structure and method of fabrication of the preferred embodiments of the present invention is that they allow for ultra-compact coils. That is to say, the separation between the coils is significantly reduced. This allows for reduced upper and lower yoke lengths, thus lowering impedance through the yoke to improve the operating frequency of the write head.

Another advantage of the structure and method of fabrication of the preferred embodiments of the present invention is that, it allows for a reduced height winding, which reduces yoke length and allows for a low apex angle over which to deposit the upper yoke. This allows high moment materials, which do not perform well when deposited over steep slopes, to be used to form the yoke. The lower stack height and corresponding lower apex angle, therefore, increases the materials available for use when forming the upper pole structure. High moment materials with low impedance to magnetic flux improve the operating frequency of the write head, and allow structures to carry greater magnetic flux without saturating. As a result, the head can write with both higher data density and higher data rate.

DESCRIPTION OF THE PREFERRED EMBODIMENTS AND METHODS OF THE INVENTION

Interlaced Winding

FIG. 1

Figure 1:
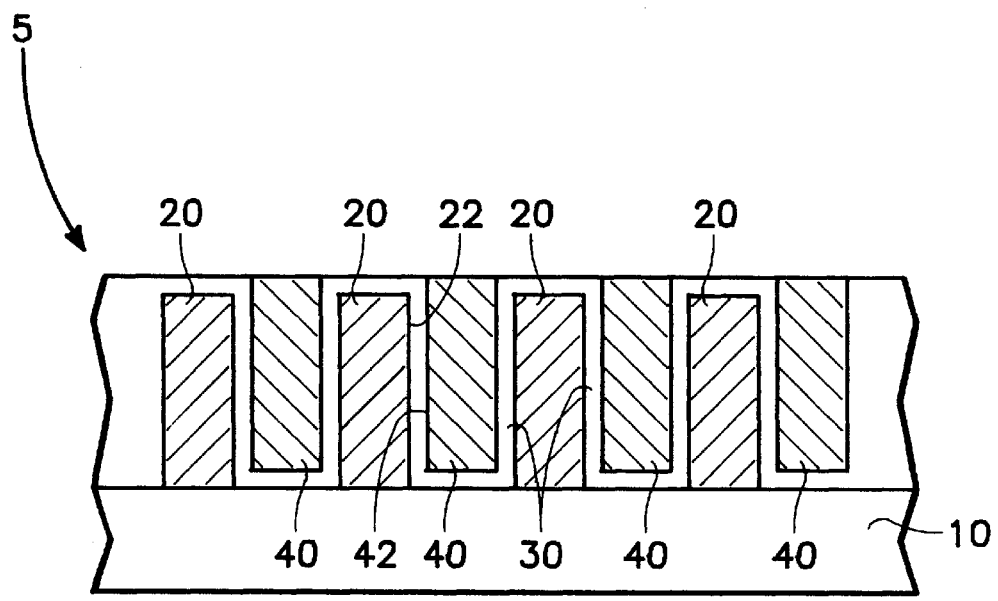
FIG. 1 shows a cross sectional view of a preferred embodiment of the coil structure of an interlaced conductor winding in accordance with the present invention.

FIG. 1 shows a cross sectional view of a preferred embodiment of the coil structure of an interlaced conductor winding in accordance with the present invention. Turns of a first coil 20 are formed on an insulation layer 10 separated by a space. Turns of a second coil 40 are formed in the space between the turns of the first coil 20. As such, successive turns of the second coil 40 are disposed between successive turns of the first coil 20 to form an interlaced winding structure 5.

As will be discussed further below, the first coil 20 may be formed using a conventional resist pattern to define the structure of the first coil 20. The turns of the second coil 40 are formed between the turns of the first coil 20 after removal of the resist pattern. An insulation material 30, located between the sidewalls 22 & 42 of the first and second conductor coils 20 & 40, is deposited prior to formation of the second coil 40 to electrically isolate the turns of the winding 5.

Such a structure allows the thickness of the insulation 30 to define the distance between successive turns of the winding. As such, it is preferred to select material for insulation 30 which can be formed very thin while providing sufficient insulation to inhibit shorting between the turns of the coils 20 & 40. It is presently preferred to form the insulation 30 of an inorganic material. In preferred embodiments of the present invention, $SiO_2$, $SiN_x$, $Al_2O_3$, or the like may be used for insulation 30.

An advantage of such inorganic material is that it may be formed on the sidewalls 22 of the first coil 20 after removal of the resist mask used to form the first coil 20. This allows the insulation 30 to be formed with a thickness below 3000 Angstroms, below 1000 Angstroms, or even below 500 Angstroms, while providing sufficient electrical insulation to reliably inhibit shorting. As a result, an ultra-compact conductor winding may be formed.

The optimum thickness to inhibit shorting while providing an ultra-compact winding, depends primarily upon the insulative properties of the material, the operating voltage and current through the coils, and the quality and uniformity of the deposited insulation 30. As such, the optimum thickness of the insulation 30, reasonably may be determined by one skilled in the art. In the preferred embodiment, the optimum thickness is expected to be in the range of about 500 Angstroms to about 1000 Angstroms for chemical vapor deposition or CVD, and for physical vapor deposition or PVD processes.

The ultra-compact winding provided by the interlaced winding structure and method of fabrication of the preferred embodiment allows yoke length and height to be reduced. As such, flux path length through the head may be reduced, thus allowing for a write head with improved high frequency response.

Preferred Embodiments of Write Head with Interlaced Winding

FIGS. 2–9

FIGS. 2–5 show cross sectional views of possible embodiments write heads in accordance with the present invention. In some embodiments of the present invention, it is preferred to form upper and lower pole structures having upper and lower yoke structures 165 & 125, and upper and lower pedestal pole tips 155 & 135 to define the write gap 145 as shown in FIGS. 2–5.

Figure 2:
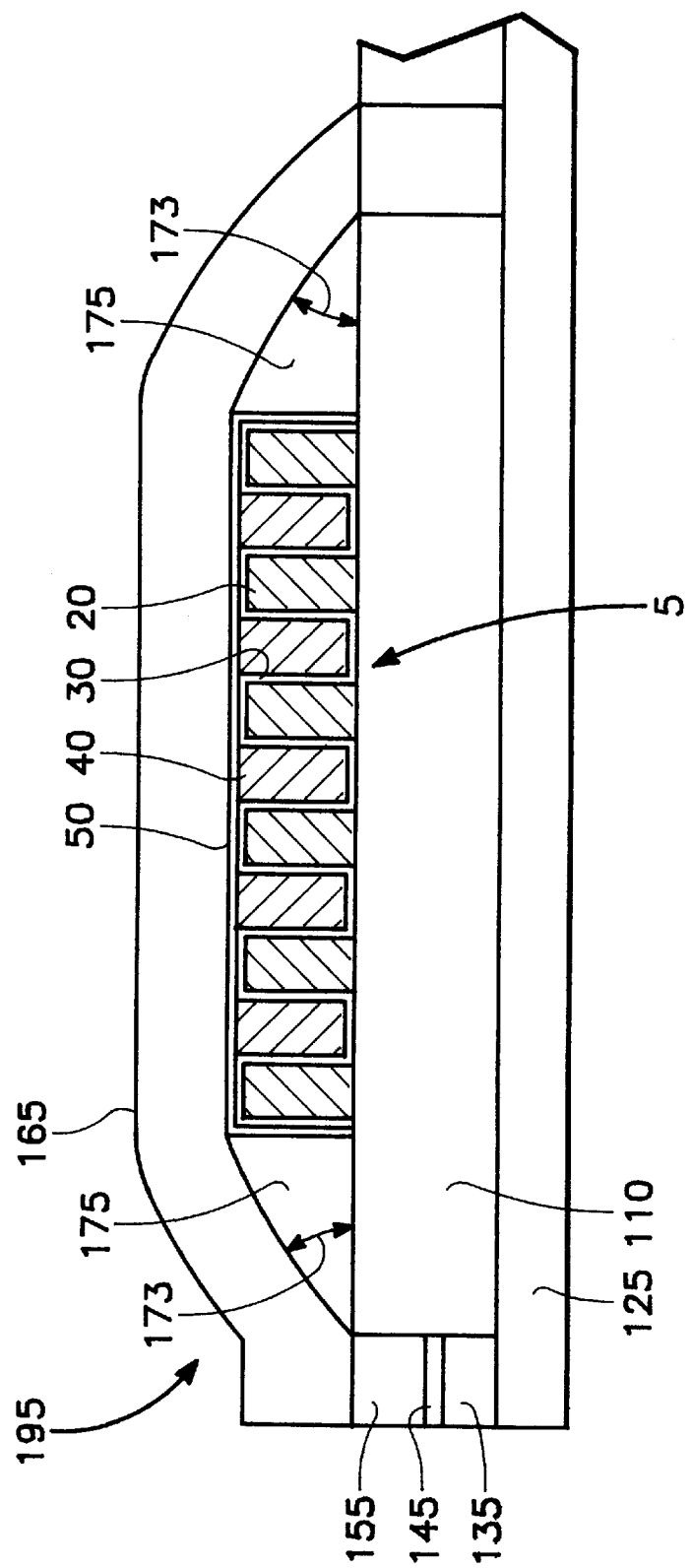
FIG. 2 shows a cross sectional view of an embodiment a write head in accordance with the present invention having a single layer conductor winding.

In the embodiment of FIG. 2, the interlaced winding 5 is formed on a middle coat layer 110. The middle coat layer 110 may be formed of any suitable insulative material. Although with the present invention the middle coat may be formed of an organic insulation, in some embodiments it is presently preferred to form the middle coat layer 110 of an inorganic material with good thermal properties so as to provide good heat dissipation of the conductor winding 5 and to provide reduced thermal expansion of the middle coat 110. As such, $SiO_2$, $SiN_x$, $Al_2O_3$, or the like may be used for middle coat 110.

The embodiment of FIG. 2 utilizes an optional inorganic capping insulation layer 50 between the winding 5 and an upper pole structure 195. The capping insulation layer 50 may be formed of $SiO_2$, $Si_x$, $Al_2O_3$, or other appropriate insulation material capable of providing a thin layer of insulation to reduce the height of the upper yoke structure 165. An organic insulation 175 may be deposited to provide a low apex angle 173 lateral to the winding 5 so that yoke material may be deposited over gradual sloping surfaces formed by the lateral insulation 175.

Although not shown, the organic insulation may cover the optional inorganic capping layer 50, or act as the capping layer in the absence of inorganic capping layer 50. As such, in some embodiments, it is preferred to also form cured photoresist over the conductors 20 & 40. In such embodiments, the capping layer 50 may, or may not, be used.

Also, with some embodiments of the present invention, as is discussed further below with reference to FIG. 14A, it is not necessary that the capping layer, or other insulating layer, be formed over a second conductor coil 40 which is planarized.

Figure 3:
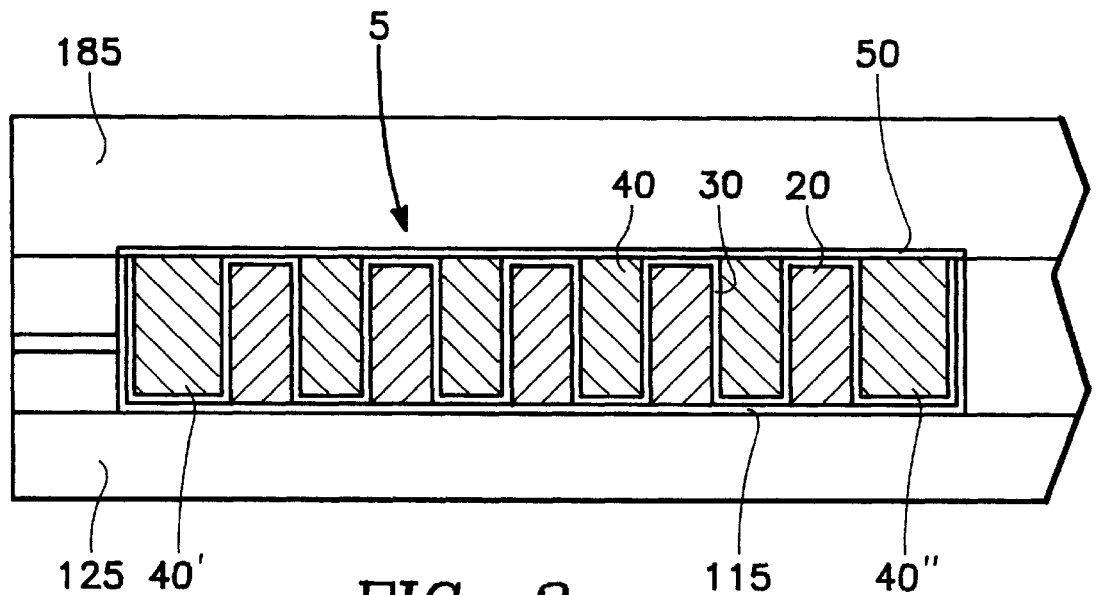
FIG. 3 shows a cross sectional view of an embodiment a write head in accordance with the present invention having a single layer conductor winding.

Turning to FIG. 3, in some embodiments of the present invention, the interlaced winding 5 may be formed on a thin middle coat insulation layer 115 deposited on the lower yoke 125. This embodiment also may have capping insulation layer 50 formed over the interlaced winding 5 as discussed above. In some embodiments, the capping layer 50 also may be formed of organic insulation if desired. The thin middle coat insulation layer 115 reduces upper yoke 185 height, and, in some embodiments, allows the upper yoke 185 to be formed generally flat. Such an embodiment not only minimizes the height of the upper yoke to reduce flux path length, but also minimizes the slope of the apex angle. This generally improves the magnetic properties of the upper yoke 185, particularly when forming the yoke with sputtered high moment magnetic materials.

It should be noted, with the present invention, the second coil 40 is not limited to having turns only located between the turns of the lower coil 20. In some embodiments, it is possible that the outermost turn and/or the innermost turn of the second coil 40 bound the winding as shown in FIG. 3 by turns 40' and 40".

Figure 4:
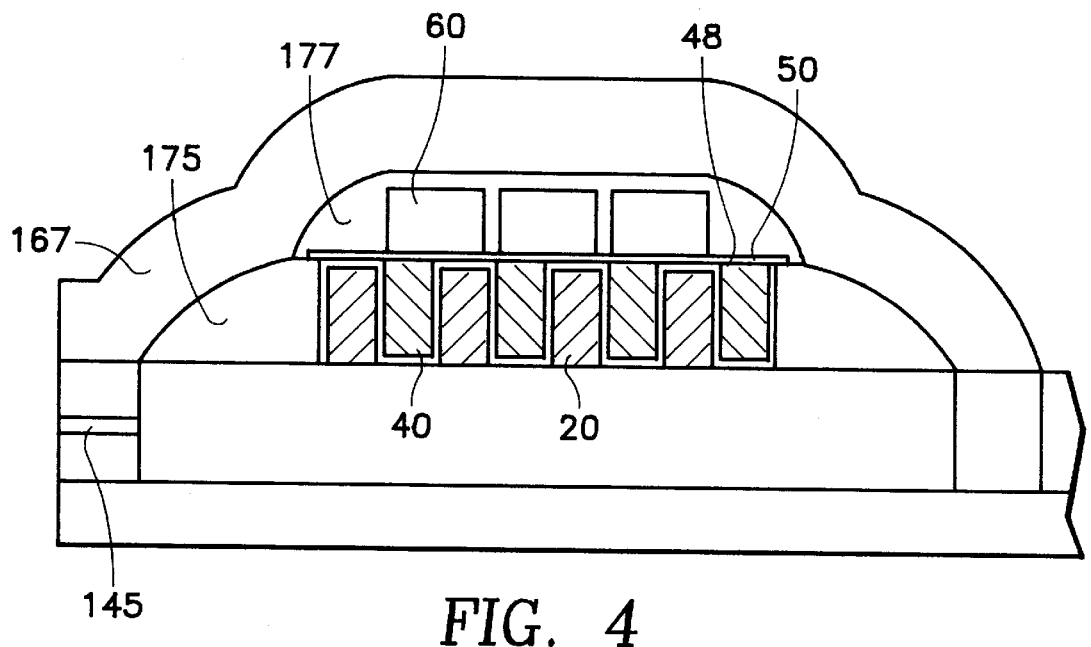
FIG. 4 shows a cross sectional view of an embodiment a write head in accordance with the present invention having a multilayer conductor winding.
Figure 5:
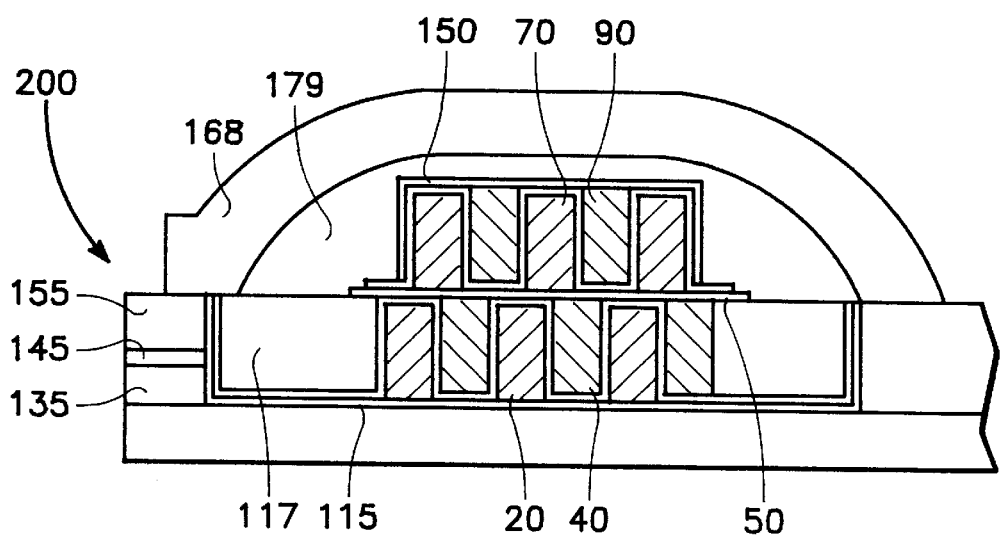
FIG. 5 shows a cross sectional view of an embodiment a write head in accordance with the present invention having a multilayer conductor winding.

Turning to FIGS. 4 & 5, embodiments of the present invention may have multiple layers of conductor coils formed over the coils 20 & 40. Referring to FIG. 4, a single conductor coil 60 may be formed over coils 20 & 40. The single conductor coil 60 may be formed using conventional lithographic processes. It also is possible to form the overlying or upper coil 60 as disclosed in U.S. patent application Ser. No. 09/268,088, filed on Mar. 12, 1999, by Hong et al., entitled ULTRA-SHORT YOKE AND ULTRA-LOW STACK HEIGHT WRITER AND METHOD OF FABRICATION, herein incorporated by reference in its entirety.

The overlaying coil 60 may be formed on insulation layer 50. The insulation layer 50 and lateral insulation 175 may be formed, as discussed above. It is preferable, in multilayer winding embodiments, to provide a generally planar surface before forming the upper layer of the winding. As such, it is preferable to planarize the top surface 48 of the second coil 40 prior to deposition of insulation layer 50, as will be discussed further below.

As shown in FIG. 4, a single layer 177 of cured photoresist may be formed, as is known it the art, to define the apex angle of the upper coil 60 and to provide insulation between the upper coil 60 and the upper yoke 167. Or, a capping insulation may be provided over the upper coil 60 to insulate the upper coil 60 from the upper yoke 167, along with lateral organic insulation to defined the apex angle, as is discussed above.

Referring to FIG. 5, embodiments of the present invention, may have interlaced conductor coils 70 & 90 overlaying the interlaced coils 20 & 40. With the embodiment of FIG. 5, the underlying or lower interlaced coils 20 & 40 may be formed on a thin insulation layer as discussed with reference to FIG. 3. The upper coils may have an optional inorganic capping insulation layer 150 with lateral organic insulation as discussed with reference to FIG. 2.

In some embodiments, such as the embodiments of FIGS. 3 & 5, where the first layer of coils 20 & 40 is formed below the write gap on a thin middle coat, a filler layer 117 as shown in FIG. 5, may be deposited lateral to the coils 20 & 40 after formation of the coils 20 & 40. The filler layer 117 may be formed of inorganic insulation which is planarized. It also is possible, although not preferred, to form filler layer 117 of organic insulation.

Referring to FIG. 5, embodiments of the present invention may have an upper yoke 168 which is recessed from the air bearing surface 200 of the write head. Such a structure provides the advantage of recessing the upper pole to upper pedestal stitch from the air bearing surface as taught by U.S. patent application Ser. No. 09/289,692, filed on Apr. 9, 1999, by Ronald A. Barr, entitled THIN FILM WRITE HEAD WITH IMPROVED YOKE TO POLE STITCH, herein incorporated by reference in its entirety.

Although the upper and lower pole tips are depicted as pedestal pole tips in FIGS. 2–5, the upper and lower pole tips may be formed having any known structure. For example, the embodiments of the write head of the present invention may have pole structures such as disclosed in: U.S. Pat. No. 5,452,164, by Cole, et al., entitled THIN FILM MAGNETIC WRITE HEAD, issued on Sep. 19, 1995; U.S. Pat. No. 5,621,593, by Kitajima, et al., entitled MAGNETORESISTIVE HEAD AND METHOD OF FABRICATING THE SAME, issued on Apr. 15, 1997; U.S. Pat. No. 5,438,747, by Kronubi, et al., entitled METHOD OF MAKING A THIN FILM MERGED HEAD WITH ALIGNED POLE TIPS, issued on Aug. 8, 1995; or U.S. patent application Ser. No. 09/289,701, filed on Apr. 9, 1999, by Rottmayer et al., entitled THIN FILM WRITER FOR HIGH DENSITY APPLICATIONS, all herein incorporated by reference in their entireties.

The interlaced winding structure of the present invention is intended to be utilized to improve write heads with all known head pole and yoke structures. For example, embodiments of the present invention may employ pedestal or non-pedestal type pole tips, which may be integrally formed, or separately formed from the yoke or the pole structure. The yoke and pole may be sputtered, or plated, to form the structures. Furthermore, the conductor winding may be formed on a middle coat, a write gap layer, a sub-write gap layer, or other suitable layer.

Figure 6:
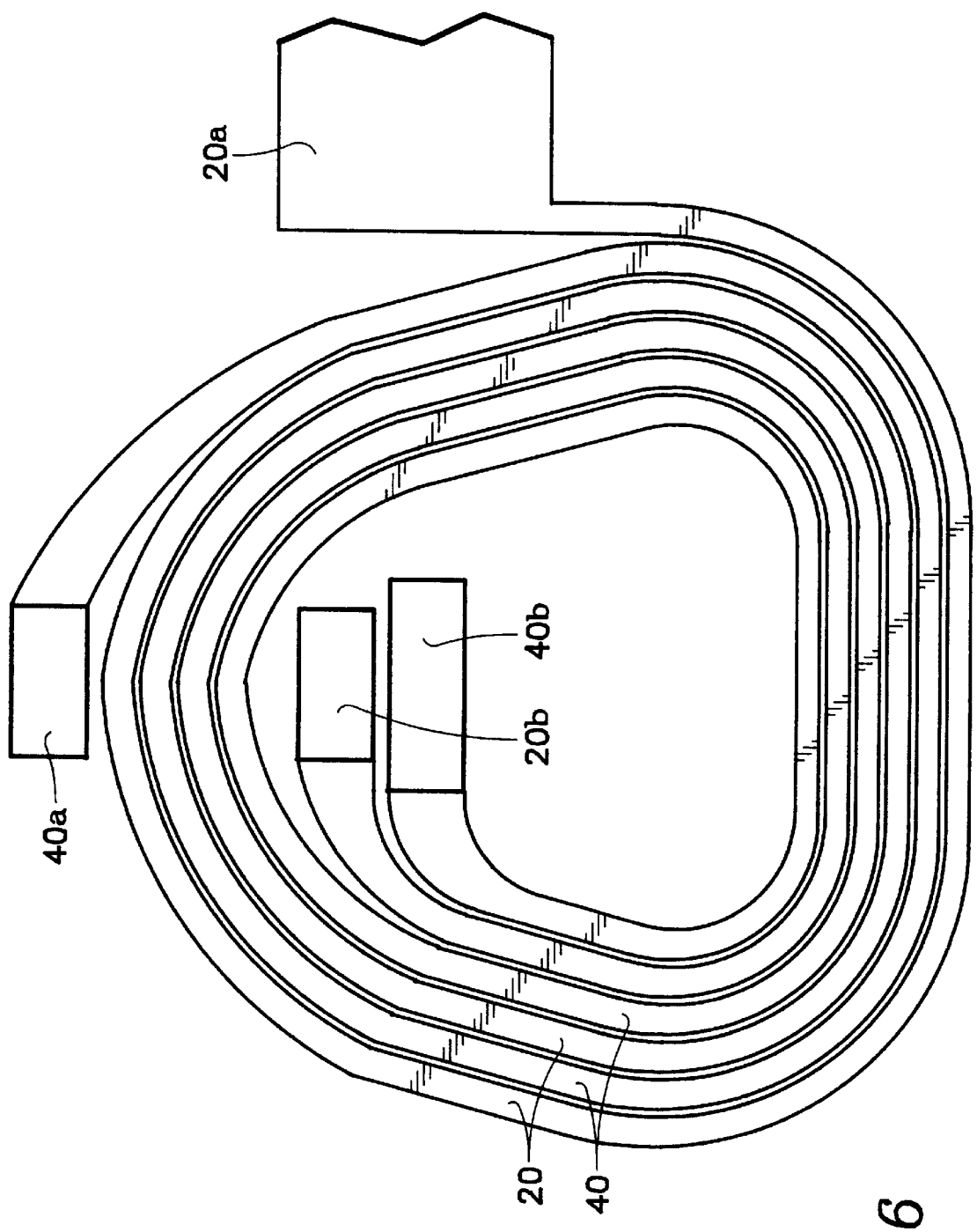
FIGS. 6 & 7 shows lower and upper layers, respectively, of a representative coil layout for the two layer coil structure of FIG. 5.
Figure 7:
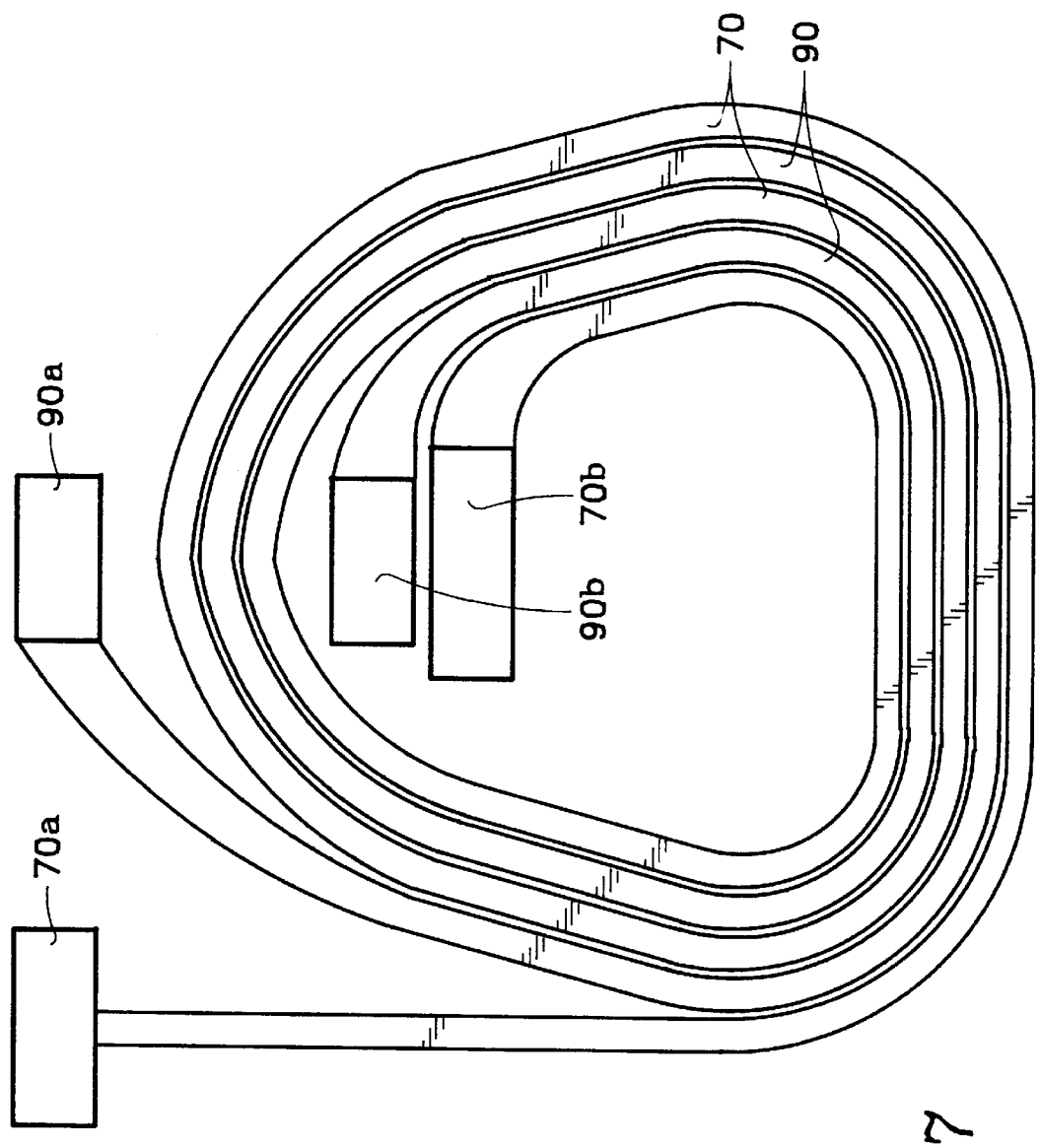
Figure 8:
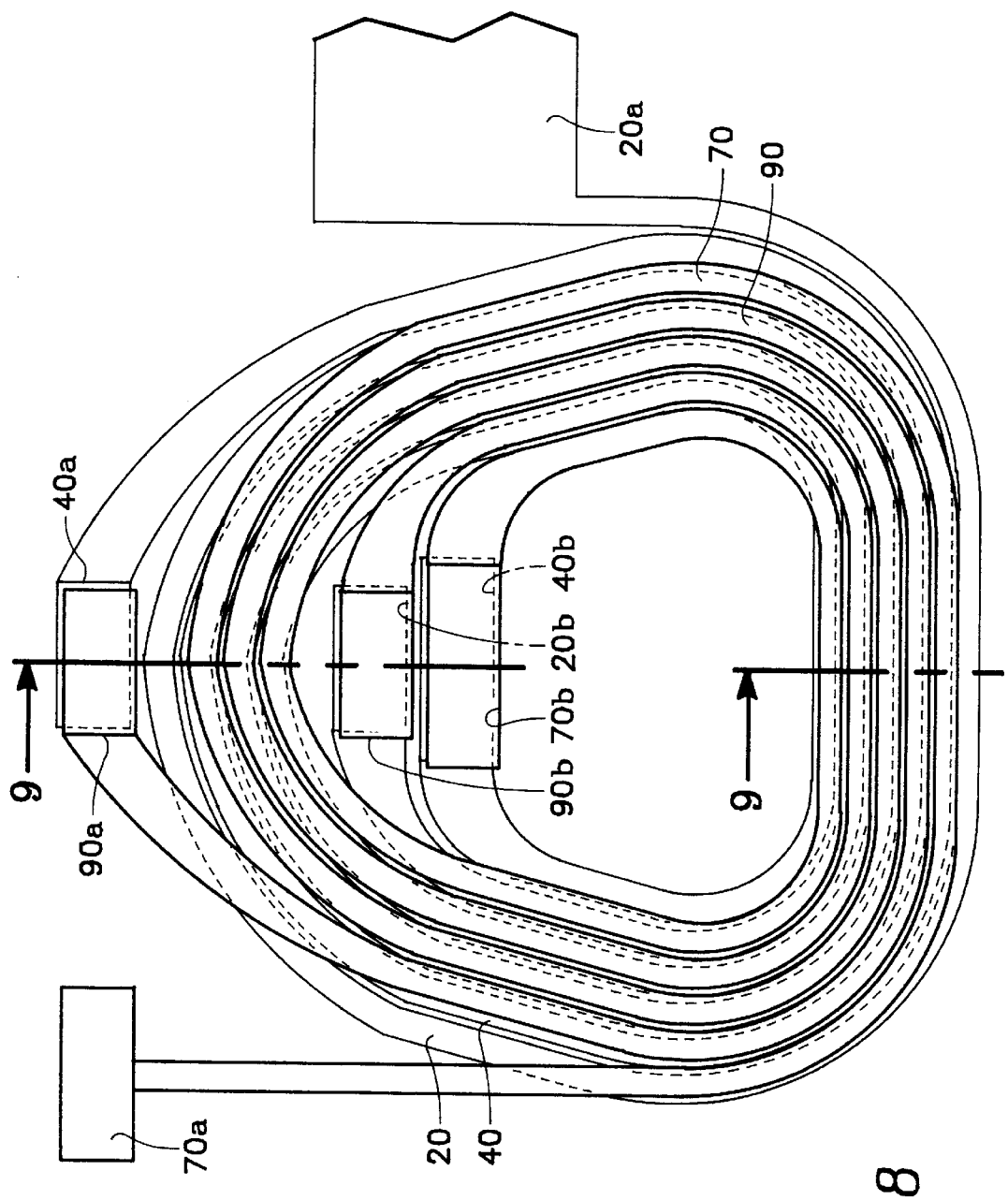
FIG. 8 shows the lower layer of FIG. 7 superimposed on the lower layer of FIG. 6.
Figure 9:
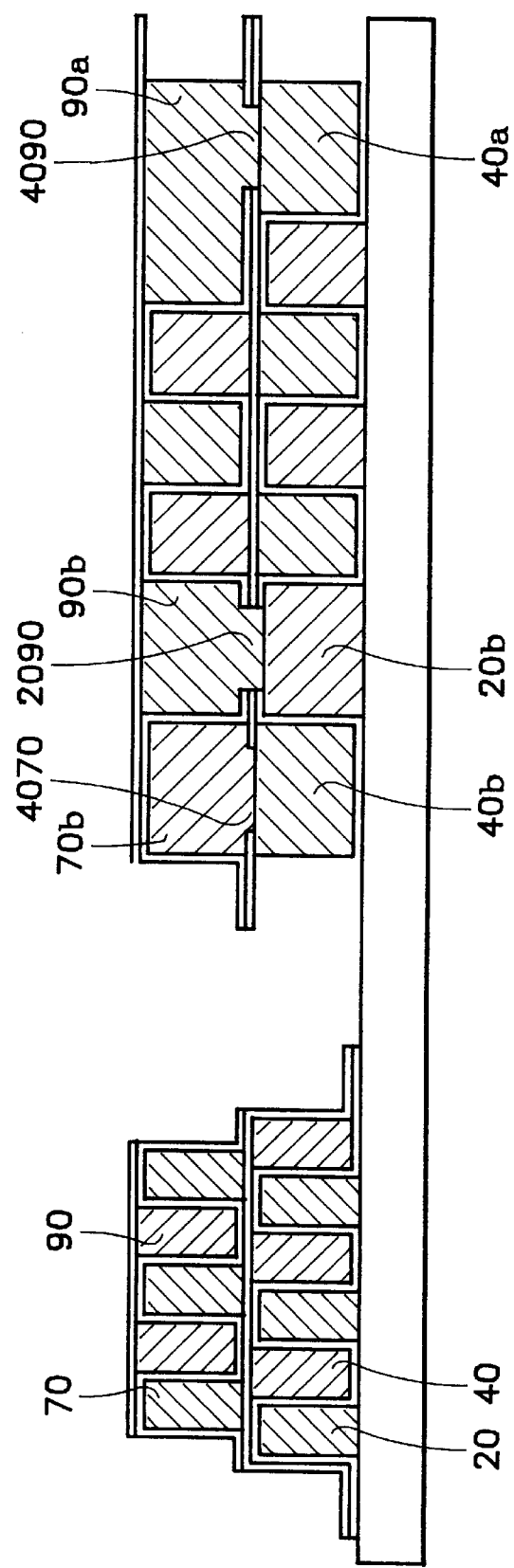
FIG. 9 shows a cross-sectional side view of FIG. 8.

FIGS. 6–9 show a non-exclusive example of a representative coil interconnection layout for the two layer coil structure of FIG. 5. FIG. 6 shows the lower layer of interleaved coils 20 & 40 having a lead 20a and connection pads 20b, 40a, and 40b. FIG. 7 shows the upper layer of interleaved coils 70 & 90 having a lead 70a and connection pads 70b, 90a, and 90b. FIG. 8 shows the upper layer of FIG. 7 superimposed on the lower layer of FIG. 6. FIG. 9 shows a cross-sectional side view of FIG. 8.

Referring to FIGS. 6–9, in this embodiment, the lead 20a is coupled to write circuitry. Connection pad 20b is coupled to connection pad 90b by a via 2090. Connection pad 90a is coupled to connection pad 40a by a via 4090. Connection pad 40b is coupled to connection pad 70b by a via 4070. Lead 70a is coupled to the write circuitry. The vias 2090, 4090 & 4070 may be formed by techniques known in the art, such as etching, to form any appropriate electrical interconnection between the coils.

Preferred Methods for Fabricating the Preferred Embodiments

FIGS. 10–15

Figure 10:
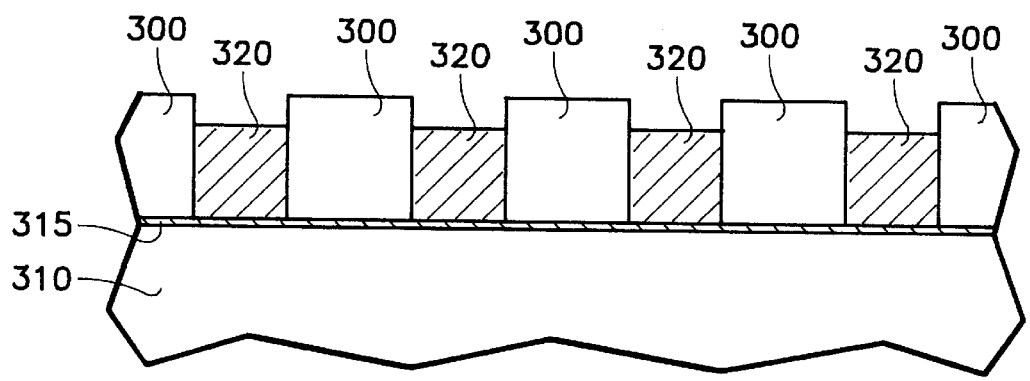
FIG. 10 shows a cross-sectional view of partial fabrication of interlaced coils in accordance with the present invention.

FIG. 10 is a cross-section of a portion of a partially fabricated coil winding in accordance with the present invention. With the preferred method of fabrication, a seed layer 315 is deposited on a generally flat insulation layer 310 to facilitate deposition of a conductive material 320 within a resist mask structure 300. The conductive material 320 may be deposited by techniques known in the art. For example, the seed layer 315 may be formed of conductive material such as copper, aluminum, gold, tungsten, or other conductive material and used in an electroplating process to deposit the conductive material 320 in the coil pattern defined by the mask 300. The seed layer may be formed several hundred to 1500 Angstroms thick by sputtering, or by CVD or chemical vapor deposition, or by any technique known in the art.

Figure 11:
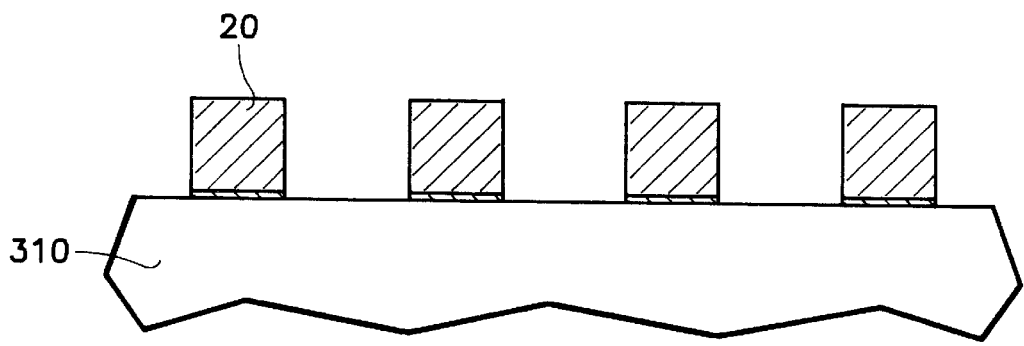
FIG. 11 shows a cross-sectional view of partial fabrication of interlaced coils in accordance with the present invention.

Turning to FIG. 11, the resist mask structure 300 is then removed. If a conductive seed layer 315 is used, portions of the seed layer 315 not under the conductor material 320 are removed to isolate the turns of the first coil 20. The portions of the seed layer 315 not under the conductor material 320 may be removed by dry or wet etching techniques. Typically, a portion of the conductor material 320 also is removed along with the exposed seed layer 315 during the etch process.

Figure 12:
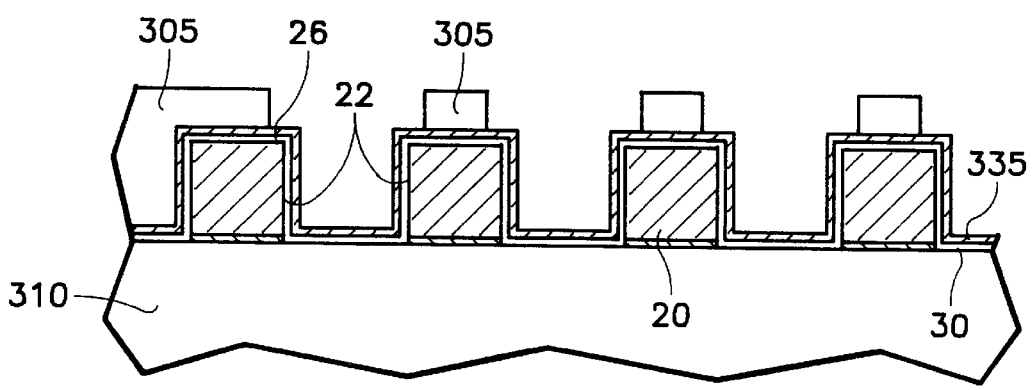
FIG. 12 shows a cross-sectional view of partial fabrication of interlaced coils in accordance with the present invention.

Turning to FIG. 12, insulation layer 30 is deposited on the first coil 20. The insulation layer 30 typically is formed conformal with the first coil 20 by using a CVD, or a PVD process. As such, the insulation layer 30 typically deposits on the top and side walls 26 & 22 of the coil 20, as well as on the exposed surface of the insulation layer 310 located between the turns of the coil 20. Thus, the insulation layer 30 lines the space between the turns of the first coil 20.

As discussed above, it is preferred to use an inorganic material so that insulation layer 30 may be formed thin while inhibiting shorting. An inorganic insulation, such as $SiO_2$, $SiN_x$, $Al_2O_3$, or the like, also is preferred for insulation layer 30 due to its good heat transfer, and its limited thermal expansion.

In a preferred method of fabrication, a second coil seed layer 335 may be employed as discussed above. In such a case, the second coil seed layer 335 is deposited over the insulation layer 30. A second coil resist mask 305 is formed on the second coil seed layer 335, and conductive material is deposited within the mask as shown in FIG. 13.

Figure 13:
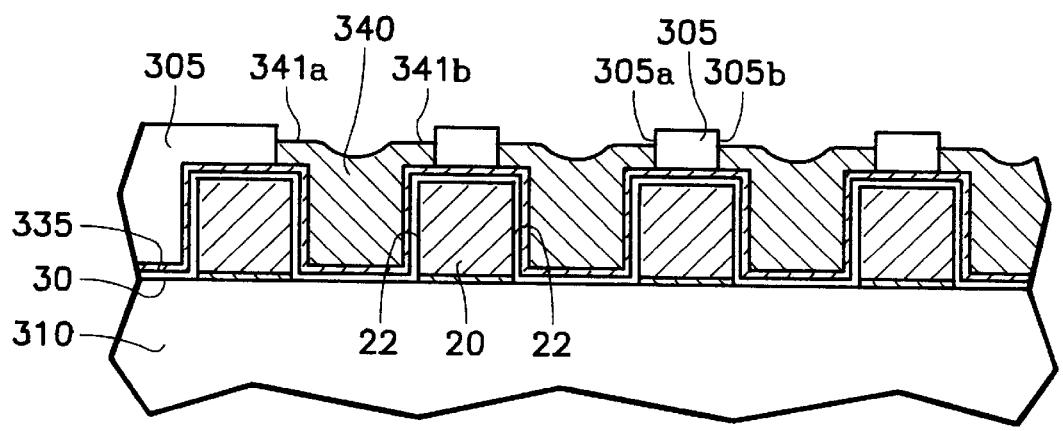
FIG. 13 shows a cross-sectional view of partial fabrication of interlaced coils in accordance with the present invention.

It should be noted that, although in some methods of the present invention, the side walls 305a & 305b of the second coil resist mask 305 may be formed so that they generally align with the side walls 22 of the first coil 20, or with the overlying insulation layer 30, with the preferred method of FIG. 13, the portion of the resist mask defined by walls 305a & 305b may be narrower than the underlying turns of the coil 20. Such an alignment of the resist mask 305 ensures uniform deposition of conductor material 340 between the turns of the first coil 20.

Thus, in the preferred method, the conductor material 340 of the second coil may be formed with small portions 341a & 341b of conductor 340 overhanging the turns of the first coil 20. As discussed in more detail below, in some embodiments, it is preferred to remove these overhanging portions 341a & 341b, while in other embodiments it is preferred to retain the overhanging portions 341a & 341b.

Although not shown in FIG. 12, it is possible, as discussed above, that a turn, or turns which bound the winding be formed of the second coil as shown in FIGS. 3, 4, & 5. With such an embodiment, the resist mask 305 also may define an outermost turn and/or an innermost turn of the second coil beyond the first coil.

Figure 14A:
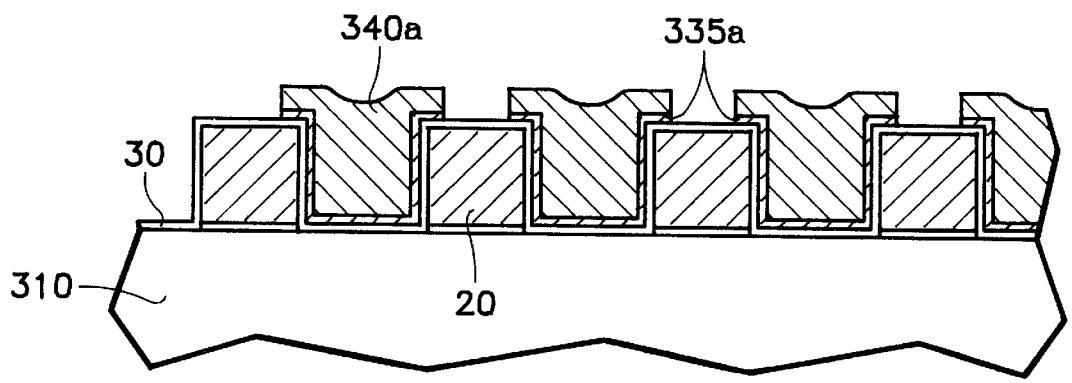
FIG. 14A shows a cross-sectional view of partial fabrication of interlaced coils in accordance with the present invention.
Figure 14B:
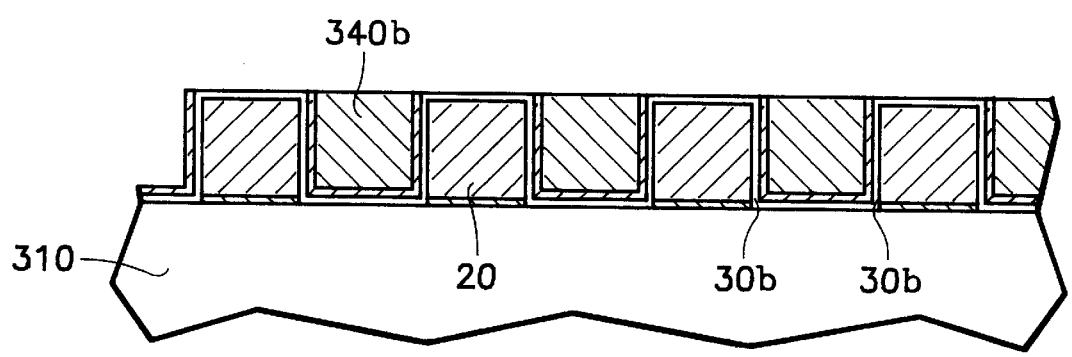
FIG. 14B shows a cross-sectional view of partial fabrication of interlaced coils in accordance with the present invention.

Turning to FIGS. 14A & 14B, the resist mask structure 305 is then removed and portions of the conductive seed layer 315 are removed to isolate the turns of the second coil 20. With the method and embodiment of FIG. 14A, portions of the seed layer 335 not under the conductor material 340a may be removed by dry or wet etching techniques after the resist mask 305 is removed. This electrically isolates the portions 335a of conductive seed layer material underlying the turns of the second coil 340a.

It is possible with some embodiments, to form a capping insulation layer over the interlaced winding of FIG. 14A. Such a capping insulation layer may be formed of organic, or of inorganic material, with sufficient thickness to insulate the interlaced winding from any additional overlying coil structure, or from an overlying upper yoke structure. As such, it is possible to form the upper yoke structure over a second coil which is unplanarized, such as on an insulation layer over, or on, the "T" shaped second coil structure 340a shown in FIG. 14A. It also is possible with such an embodiment to use a planarization technique, such as chemical mechanical polish after insulation deposition, to provide a planar surface prior to forming any overlying structure.

Referring to FIG. 14B, as an alternative to the seed layer etching method of FIG. 14A, it is possible to isolate the turns of the second coil material 340 of FIG. 13 by planarization. With this method, a chemical mechanical polish or CMP may be used to remove the portion of the seed layer 335 overlying the turns of the first coil 20. With this method, it is possible to polish or lap part way into a portion of the insulation layer 30 overlying the turns of the first coil 20. Furthermore, it is possible, if desired, to lap part way into the turns of the first coil 20.

Referring to FIGS. 12 & 14B, it is also possible to form the lower coil without using the resist mask 305 over the first coil 20. In such embodiments, the second coil 340b may be defined by planarization as discussed above. Thus, planarization may be used to remove the material overlying the first coil 20 to electrically isolate the turns of the second coil 340b. As discussed above, the planarization may lap into the insulation layer 30b to define the turns of the second coil 340b.

Figure 15:
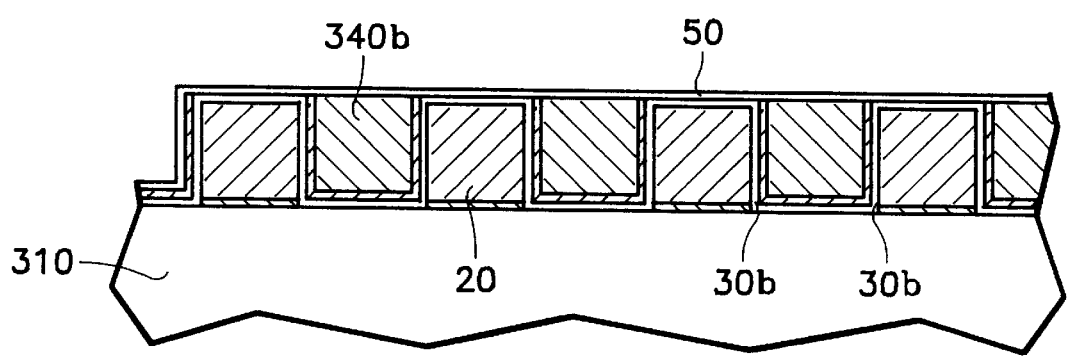
FIG. 15 shows a cross-sectional view of partial fabrication of interlaced coils in accordance with the present invention.

Turning to FIG. 15, a capping insulation layer 50 may be deposited over the planarized surface to insulate any exposed conductor material. Such a capping layer may be formed of inorganic material, or of organic material as discussed above.

An advantage of the structure and method of fabrication of the preferred embodiments of the present invention is that they allow for ultra-compact coils. That is to say, the separation between the coils is significantly reduced. This allows for reduced upper and lower yoke lengths, thus lowering impedance through the yoke to improve the operating frequency of the write head.

Another advantage of the structure and method of fabrication of the preferred embodiments of the present invention is that they allow for a low apex angle to deposit the upper yoke over as a result of the reduced height of the winding. This allows high moment materials, which do not perform well when deposited over steep slopes, to be used to form the yoke. The lower stack height and corresponding lower apex angle, therefore, increases the materials available for use when forming the upper pole structure. High moment materials with low impedance to magnetic flux improve the operating frequency of the write head, and allow structures to carry greater magnetic flux without saturating. As a result, the head can write with both higher data density and higher data rate.

Improved Data Storage and Retrieval

FIG. 16

Figure 16:
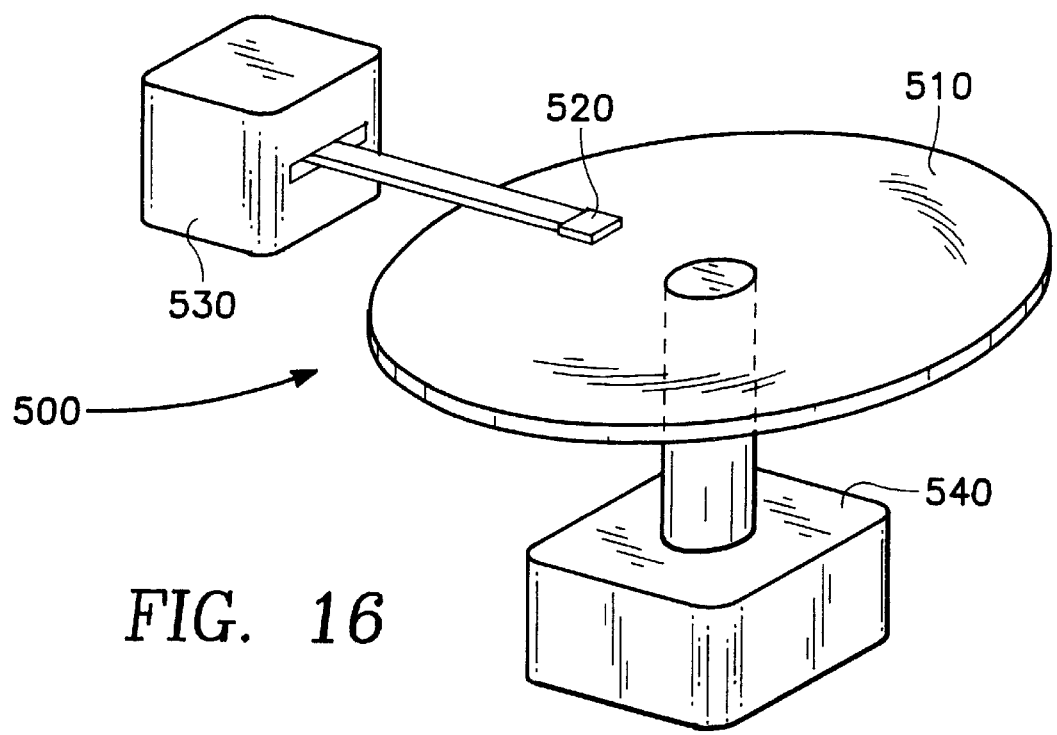
FIG. 16 illustrates a possible embodiment of a data storage and retrieval apparatus embodying the write head of the present invention.

FIG. 16 is a simplified functional illustration showing the thin film write head of the present invention embodied in a disk type magnetic data storage and retrieval apparatus 500. The write head of the present invention is located within a merged head assembly 520 which rides above a magnetic storage media 510, depicted in FIG. 16 as a rotatable hard disk type storage media. The hard disk 510 is coupled to a motor 540 to provide rotation of the disk relative to the head assembly 520. An actuating means 530 may be used to position the head assembly 520 above the surface of the media 510 to read and write data in the form of magnetic bits from and to the media 510. The data storage and retrieval apparatus 500, typically has several hard disks 510 and several corresponding head assemblies 520. The disk type magnetic data storage and retrieval apparatus is shown for example purposes, the thin film write head of the present invention also is intended to be utilized to improve aerial density and data rate of tape type magnetic data storage and retrieval apparatus.

While the preferred embodiments of the present invention have been described in detail above, many changes to these embodiments may be made without departing from the true scope and teachings of the present invention. The present invention, therefore, is limited only as claimed below and the equivalents thereof.

What we claim is:

1. A thin film write head comprising:
    a) upper and lower pole structures having opposing pole tips;
    b) a write gap disposed between the opposing pole tips;
    c) a conductor winding including interlaced first and second conductor coils; and
    d) a serpentine insulation layer disposed over the first conductor coil and under the second conductor coil.

2. The thin film write head of claim 1 wherein conductor winding comprises turns of the first coil and the turns a of second coil, and wherein successive turns of the winding comprise alternating turns of the first and the second coils.

3. The thin film write head of claim 2 wherein the turns of first coil and the turns of the second coil are spaced less is than 3000 Angstroms apart.

4. The thin film write head of claim 2 wherein the turns of the first coil and the turns of the second coil are spaced less than 1000 Angstroms apart.

5. The thin film write head of claim 2 wherein the turns of the first coil and the turns of the second coil are spaced less than 500 Angstroms apart.

6. The thin film write head of claim 2 wherein the turns of the first and second coils form a first layer, and wherein the conductor winding further comprises a second layer disposed over the first layer.

7. The thin film write head of claim 6 wherein the second layer comprises turns of a third coil and a fourth coil, and wherein the turns of the second layer are interlaced so that successive turns of the second layer comprise alternating turns of the third and the fourth coils.

8. The thin film write head of claim 1 wherein the conductor winding comprises turns of the first coil and the second coil, and wherein the first and second coils have opposing sidewalls.

9. The thin film write head of claim 8 wherein inorganic insulation is disposed between the opposing sidewalls.

10. The thin film write head of claim 9 wherein the opposing sidewalls are spaced about 2000 Angstroms apart.

11. The thin film write head of claim 1 wherein the conductor winding comprises:
 a) a first coil having turns;
 b) each of the turns of the first coil being separated by a space;
 c) a second coil having turns disposed within the space; and
 d) an insulative material interposed between the turns of the first and the second coils.

12. The thin film write head of claim 11 wherein the insulative material forms a lining between the turns of the first and the second coils.

13. The thin film write head of claim 12 wherein the lining comprises an inorganic insulator.

14. The thin film write head of claim 1 wherein the interlaced conductor coils comprises turns of the first coil and turns of the second coil having sidewalls, and wherein the sidewalls of the second coil are generally parallel with the sidewalls of the first coil.

15. The thin film write head of claim 14 wherein at least some of the turns of the second coil have at least a portion overhanging an adjacent turn of the first coil.

16. The thin film write head of claim 1 further comprising an insulating middle coat layer disposed between the lower pole structure and the conductor winding.

17. The thin film write head of claim 16 wherein the insulating middle coat layer is formed from an inorganic material.

18. The thin film write head of claim 16 wherein the insulating middle coat layer is formed from $SiO_2$, $SiN_x$, or $Al_2O_3$.

19. The thin film write head of claim 16 wherein the upper pole structure includes an upper yoke having a generally flat lower surface extending from an upper pedestal pole tip to a backgap pedestal.

20. The thin film write head of claim 19 further including an organic insulating capping layer.

21. The thin film write head of claim 1 further comprising an insulating capping layer disposed between the upper pole structure and the conductor winding.

22. The thin film write head of claim 21 wherein the insulating capping layer is formed from an inorganic material.

23. The thin film write head of claim 21 wherein the insulating capping layer is formed from $SiO_2$, $SiN_x$, or $Al_2O_3$.

24. The thin film write head of claim 1 further comprising an organic layer disposed between the upper pole structure and the lower pole structure and defining an apex angle between an insulating middle coat layer and the upper pole structure.

* * * * *